US009672257B2

(12) United States Patent
Tobin et al.

(10) Patent No.: US 9,672,257 B2
(45) Date of Patent: Jun. 6, 2017

(54) TIME-SERIES DATA STORAGE AND PROCESSING DATABASE SYSTEM

(71) Applicant: Palantir Technologies Inc., Palo Alto, CA (US)

(72) Inventors: David Tobin, Atherton, CA (US); Dylan Scott, Palo Alto, CA (US); Orcun Simsek, New York, NY (US); Steven Fackler, Menlo Park, CA (US); Wilson Wong, Menlo Park, CA (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

(21) Appl. No.: 15/171,494

(22) Filed: Jun. 2, 2016

(65) Prior Publication Data

US 2016/0357828 A1  Dec. 8, 2016

Related U.S. Application Data

(60) Provisional application No. 62/171,875, filed on Jun. 5, 2015.

(51) Int. Cl.
*G06F 17/30* (2006.01)
(52) U.S. Cl.
CPC .. *G06F 17/30551* (2013.01); *G06F 17/30398* (2013.01); *G06F 17/30554* (2013.01)
(58) Field of Classification Search
None
See application file for complete search history.

(56) References Cited

U.S. PATENT DOCUMENTS

| 5,532,717 A | 7/1996 | Jones et al. |
| 5,724,575 A | 3/1998 | Hoover et al. |

(Continued)

FOREIGN PATENT DOCUMENTS

| AU | 2014206155 | 12/2015 |
| EP | 0652513 | 5/1995 |

(Continued)

OTHER PUBLICATIONS

Anonymous, "BackTult—JD Edwards One World Version Control System", in 1 page, Jul. 23, 2007.

(Continued)

*Primary Examiner* — Anh Tai Tran
(74) *Attorney, Agent, or Firm* — Knobbe Martens Olson & Bear LLP

(57) ABSTRACT

A database system is described that includes components for storing time-series data and executing custom, user-defined computational expressions in substantially real-time such that the results can be provided to a user device for display in an interactive user interface. For example, the database system may process stored time-series data in response to requests from a user device. The request may include a start time, an end time, a period, and/or a computational expression. The database system may retrieve the time-series data identified by the computational expression and, for each period, perform the arithmetic operation(s) identified by the computational expression on data values corresponding to times within the start time and the end time. Once all new data values have been generated, the database system may transmit the new data values to the user device for display in the interactive user interface.

13 Claims, 14 Drawing Sheets

(56) References Cited

U.S. PATENT DOCUMENTS

| | | |
|---|---|---|
| 5,872,973 A | 2/1999 | Mitchell et al. |
| 5,897,636 A | 4/1999 | Kaeser |
| 6,073,129 A | 6/2000 | Levine et al. |
| 6,094,653 A | 7/2000 | Li et al. |
| 6,161,098 A | 12/2000 | Wallman |
| 6,243,717 B1 | 6/2001 | Gordon et al. |
| 6,304,873 B1 | 10/2001 | Klein et al. |
| 6,366,933 B1 | 4/2002 | Ball et al. |
| 6,418,438 B1 | 7/2002 | Campbell |
| 6,510,504 B2 | 1/2003 | Satyanarayana |
| 6,549,752 B2 | 4/2003 | Tsukamoto |
| 6,560,620 B1 | 5/2003 | Ching |
| 6,574,635 B2 | 6/2003 | Stauber et al. |
| 6,745,382 B1 | 6/2004 | Zothner |
| 6,976,210 B1 | 12/2005 | Silva et al. |
| 6,980,984 B1 | 12/2005 | Huffman et al. |
| 7,058,648 B1 | 6/2006 | Lightfoot et al. |
| 7,111,231 B1 | 9/2006 | Huck et al. |
| 7,194,680 B1 | 3/2007 | Roy et al. |
| 7,461,158 B2 | 12/2008 | Rider et al. |
| 7,725,530 B2 | 5/2010 | Sah et al. |
| 7,725,728 B2 | 5/2010 | Ama et al. |
| 7,730,082 B2 | 6/2010 | Sah et al. |
| 7,730,109 B2 | 6/2010 | Rohrs et al. |
| 7,761,407 B1 | 7/2010 | Stern |
| 7,814,084 B2 | 10/2010 | Hallett et al. |
| 7,962,495 B2 | 6/2011 | Jain et al. |
| 7,984,374 B2 | 7/2011 | Caro et al. |
| 8,041,714 B2 | 10/2011 | Aymeloglu et al. |
| 8,112,425 B2 | 2/2012 | Baum et al. |
| 8,126,848 B2 | 2/2012 | Wagner |
| 8,185,819 B2 | 5/2012 | Sah et al. |
| 8,504,542 B2 | 8/2013 | Chang et al. |
| 8,676,857 B1 | 3/2014 | Adams et al. |
| 8,930,331 B2 | 1/2015 | McGrew et al. |
| 8,954,410 B2 | 2/2015 | Chang et al. |
| 9,009,827 B1 | 4/2015 | Albertson et al. |
| 9,043,696 B1 | 5/2015 | Meiklejohn et al. |
| 9,092,482 B2 | 7/2015 | Harris et al. |
| 9,116,975 B2 | 8/2015 | Shankar et al. |
| 9,208,159 B2 | 12/2015 | Stowe et al. |
| 9,230,280 B1 | 1/2016 | Maag et al. |
| 9,280,532 B2 | 3/2016 | Cicerone |
| 2001/0051949 A1 | 12/2001 | Carey et al. |
| 2001/0056522 A1 | 12/2001 | Satyanarayana |
| 2002/0091694 A1 | 7/2002 | Hrle et al. |
| 2003/0105759 A1 | 6/2003 | Bess et al. |
| 2003/0115481 A1 | 6/2003 | Baird et al. |
| 2003/0120675 A1 | 6/2003 | Stauber et al. |
| 2003/0130993 A1 | 7/2003 | Mendelevitch et al. |
| 2003/0212718 A1 | 11/2003 | Tester |
| 2004/0111410 A1 | 6/2004 | Burgoon et al. |
| 2004/0117345 A1 | 6/2004 | Bamford et al. |
| 2004/0117387 A1 | 6/2004 | Civetta et al. |
| 2004/0148301 A1 | 7/2004 | McKay et al. |
| 2005/0097441 A1 | 5/2005 | Herbach et al. |
| 2005/0108231 A1 | 5/2005 | Findleton et al. |
| 2005/0114763 A1 | 5/2005 | Nonomura et al. |
| 2005/0289524 A1 | 12/2005 | McGinnes |
| 2006/0074881 A1 | 4/2006 | Vembu et al. |
| 2006/0080316 A1 | 4/2006 | Gilmore et al. |
| 2006/0095521 A1 | 5/2006 | Patinkin |
| 2006/0106847 A1 | 5/2006 | Eckardt et al. |
| 2006/0116991 A1 | 6/2006 | Calderwood |
| 2006/0161558 A1 | 7/2006 | Tamma et al. |
| 2006/0218206 A1 | 9/2006 | Bourbonnais et al. |
| 2006/0218405 A1 | 9/2006 | Ama et al. |
| 2006/0218491 A1 | 9/2006 | Grossman et al. |
| 2006/0242630 A1 | 10/2006 | Koike et al. |
| 2006/0253502 A1 | 11/2006 | Raman et al. |
| 2006/0265397 A1 | 11/2006 | Bryan et al. |
| 2007/0050429 A1 | 3/2007 | Goldring et al. |
| 2007/0061487 A1 | 3/2007 | Moore et al. |
| 2007/0143253 A1 | 6/2007 | Kostamaa et al. |
| 2007/0185850 A1 | 8/2007 | Walters et al. |
| 2007/0233756 A1 | 10/2007 | D'Souza et al. |
| 2007/0271317 A1 | 11/2007 | Carmel |
| 2008/0015970 A1 | 1/2008 | Brookfield et al. |
| 2008/0104060 A1 | 5/2008 | Abhyankar et al. |
| 2008/0104149 A1 | 5/2008 | Vishniac et al. |
| 2008/0195672 A1 | 8/2008 | Hamel et al. |
| 2008/0201339 A1 | 8/2008 | McGrew |
| 2008/0215546 A1 | 9/2008 | Baum et al. |
| 2008/0270316 A1 | 10/2008 | Guidotti et al. |
| 2008/0301378 A1 | 12/2008 | Carrie |
| 2009/0031247 A1 | 1/2009 | Walter et al. |
| 2009/0106308 A1 | 4/2009 | Killian et al. |
| 2009/0164387 A1 | 6/2009 | Armstrong et al. |
| 2009/0177962 A1 | 7/2009 | Gusmorino et al. |
| 2009/0254971 A1 | 10/2009 | Herz |
| 2009/0271435 A1 | 10/2009 | Yako et al. |
| 2009/0313223 A1 | 12/2009 | Rantanen |
| 2009/0313311 A1 | 12/2009 | Hoffmann et al. |
| 2010/0036831 A1 | 2/2010 | Vemuri et al. |
| 2010/0070489 A1 | 3/2010 | Aymeloglu et al. |
| 2010/0076939 A1 | 3/2010 | Iwaki et al. |
| 2010/0082541 A1 | 4/2010 | Kottomtharayil |
| 2010/0114817 A1 | 5/2010 | Broeder et al. |
| 2010/0114831 A1 | 5/2010 | Gilbert et al. |
| 2010/0114887 A1 | 5/2010 | Conway et al. |
| 2010/0138842 A1 | 6/2010 | Balko et al. |
| 2010/0145909 A1 | 6/2010 | Ngo |
| 2010/0161565 A1 | 6/2010 | Lee et al. |
| 2010/0161688 A1 | 6/2010 | Kesselman et al. |
| 2010/0191884 A1 | 7/2010 | Holenstein et al. |
| 2010/0211550 A1 | 8/2010 | Daniello et al. |
| 2010/0211618 A1 | 8/2010 | Anderson et al. |
| 2010/0235606 A1 | 9/2010 | Oreland et al. |
| 2010/0283787 A1 | 11/2010 | Hamedi et al. |
| 2010/0325581 A1 | 12/2010 | Finkelstein et al. |
| 2011/0029498 A1 | 2/2011 | Ferguson et al. |
| 2011/0047540 A1 | 2/2011 | Williams et al. |
| 2011/0153592 A1 | 6/2011 | DeMarcken |
| 2011/0173619 A1 | 7/2011 | Fish |
| 2011/0184813 A1 | 7/2011 | Barne et al. |
| 2011/0218978 A1* | 9/2011 | Hong .............. G06F 17/30551 707/694 |
| 2011/0258158 A1 | 10/2011 | Resende et al. |
| 2011/0258242 A1 | 10/2011 | Eidson et al. |
| 2011/0270812 A1 | 11/2011 | Ruby |
| 2012/0013684 A1 | 1/2012 | Robertson et al. |
| 2012/0072825 A1 | 3/2012 | Sherkin et al. |
| 2012/0123989 A1 | 5/2012 | Yu et al. |
| 2012/0124179 A1 | 5/2012 | Cappio et al. |
| 2012/0150791 A1 | 6/2012 | Willson |
| 2012/0159307 A1 | 6/2012 | Chung et al. |
| 2012/0330908 A1 | 12/2012 | Stowe et al. |
| 2013/0036346 A1 | 2/2013 | Cicerone |
| 2013/0060742 A1 | 3/2013 | Chang et al. |
| 2013/0097130 A1 | 4/2013 | Bingol et al. |
| 2013/0151388 A1 | 6/2013 | Falkenborg et al. |
| 2013/0304770 A1 | 11/2013 | Boero et al. |
| 2013/0318060 A1 | 11/2013 | Chang et al. |
| 2014/0040276 A1* | 2/2014 | Chen .............. G06F 17/30339 707/746 |
| 2014/0095543 A1* | 4/2014 | Hsiao .............. G06F 17/30442 707/779 |
| 2014/0149272 A1 | 5/2014 | Hirani et al. |
| 2014/0181833 A1 | 6/2014 | Bird et al. |
| 2014/0324876 A1 | 10/2014 | Konik et al. |
| 2014/0344231 A1 | 11/2014 | Stowe et al. |
| 2015/0039886 A1 | 2/2015 | Kahol et al. |
| 2015/0089353 A1 | 3/2015 | Folkening |
| 2015/0106347 A1 | 4/2015 | McGrew et al. |
| 2015/0112956 A1 | 4/2015 | Chang et al. |
| 2015/0212663 A1 | 7/2015 | Papale et al. |
| 2015/0213043 A1 | 7/2015 | Ishii et al. |
| 2015/0213134 A1 | 7/2015 | Nie et al. |
| 2015/0227295 A1 | 8/2015 | Meiklejohn et al. |
| 2015/0242397 A1 | 8/2015 | Zhuang |
| 2015/0261817 A1 | 9/2015 | Harris et al. |
| 2015/0278325 A1* | 10/2015 | Masuda .............. G06F 17/30575 707/624 |

(56) References Cited

U.S. PATENT DOCUMENTS

| | | |
|---|---|---|
| 2015/0341467 A1 | 11/2015 | Lim et al. |
| 2016/0034545 A1 | 2/2016 | Shankar et al. |
| 2016/0062555 A1 | 3/2016 | Ward et al. |

FOREIGN PATENT DOCUMENTS

| | | |
|---|---|---|
| EP | 2555126 | 2/2013 |
| EP | 2863326 | 4/2015 |
| EP | 2891992 | 7/2015 |
| EP | 2993595 | 3/2016 |
| EP | 3 101 560 | 12/2016 |
| WO | WO 2008/043082 | 4/2008 |
| WO | WO 2012/025915 | 3/2012 |

OTHER PUBLICATIONS

Antoshenkov, Gennady, "Dictionary-Based Order-Preserving String Compression", The VLDB Journal, pp. 26-39, 1997.
"Apache HBase," http://hbase.apache.org/ printed Sep. 14, 2011 in 1 page.
Baker et al., "Megastore: Providing Scalable, Highly Available Storage for Interactive Services", 5th Biennial Conference on Innovative Data Systems Research (CIDR '11), Asilomar, California, Jan. 9-12, 2011.
Bernstein et al., "Hyder—A Transactional Record Manager for Shared Flash", 5th Biennial Conference on Innovative Data Systems Research (CIDR '11), vol. 12, Asilomar, California, Jan. 9-12, 2011.
Chang et al., "Bigtable: A Distributed Storage System for Structured Data", Google, Inc., OSDI'06: Seventh Symposium on Operating System Design and Implementation, Seattle, WA, Nov. 2006.
Chung, Chin-Wan, "Dataplex: An Access to Heterogeneous Distributed Databases", Communications of the ACM, Association for Computing Machinery, Inc., vol. 33, Issue No. 1, pp. 70-80, Jan. 1, 1990.
Devanbu et al., "Authentic Third-party Data Publication", http://www.cs.ucdavis.edu/~devanbu/authdbpub.pdf, p. 19, 2000.
Dreyer et al., "An Object-Oriented Data Model for a Time Series Management System", Proceedings of the 7th International Working Conference on Scientific and Statistical Database Management, p. 12, Charlottesville, Virginia, USA, Sep. 28-30, 1994.
Elmasri et al., "Fundamentals of Database Systems", Fourth Edition, pp. 455-491, 2004.
Hogue et al., "Thresher: Automating the Unwrapping of Semantic Content from the World Wide Web", 14th International Conference on World Wide Web, WWW 2005: Chiba, Japan, May 10-14, 2005.
Klemmer et al., "Where Do Web Sites Come From? Capturing and Interacting with Design History," Association for Computing Machinery, CHI 2002, Apr. 20-25, 2002, Minneapolis, MN, pp. 8.
Mentzas et al., "An Architecture for Intelligent Assistance in the Forecasting Process", Proceedings of the Twenty-Eighth Hawaii International Conference on System Sciences, vol. 3, pp. 167-176, Jan. 3-6, 1995.
Miklau et al., "Securing History: Privacy and Accountability in Database Systems", 3rd Biennial Conference on Innovative Data Systems Research (CIDR), pp. 387-396, Asilomar, California, Jan. 7-10, 2007.
Niepert et al., "A Dynamic Ontology for a Dynamic Reference Work", Joint Conference on Digital Libraries, pp. 1-10, Vancouver, British Columbia, Jun. 17-22, 2007.
Nierman, "Evaluating Structural Similarity in XML Documents", 6 pages, 2002.
Peng et al., "Large-scale Incremental Processing Using Distributed Transactions and Notifications", Proceedings of the 9th USENIX Symposium on Operating Systems Design and Implementation, USENIX, p. 14, 2010.
QUEST, "Toad for ORACLE 11.6—Guide to Using Toad", pp. 1-162, Sep. 24, 2012.
"The Apache Cassandra Project," http://cassandra.apache.org/ Printed Sep. 14, 2011 in 3 pages.
Thomson et al., "The Case for Determinism in Database Systems", The 36th International Conference on Very Large Data Bases, Proceedings of the VLDB Endowment, vol. 3, Issue No. 1, p. 11, Singapore, Sep. 13-17, 2010.
Wikipedia, "Federated Database System," Sep. 7, 2013, retrieved from the internet on Jan. 27, 2015 http://en.wikipedia.org/w/index.php?title=Federated_database_system&oldid=571954221.
Wollrath et al., "A Distributed Object Model for the Java System", Conference on Object-Oriented Technologies and Systems, pp. 219-231, Jun. 17-21, 1996.
Yang et al., "HTML Page Analysis Based on Visual Cues", A129, pp. 859-864, 2001.
Zhao et al., "Exploratory Analysis of Time-Series with ChronoLenses", IEEE Transactions on Visualization and Computer Graphics, vol. 17, No. 12, Dec. 2011, pp. 2422-2431.
Notice of Allowance for U.S. Appl. No. 13/196,788 dated Dec. 18, 2015.
Notice of Allowance for U.S. Appl. No. 13/826,228 dated Mar. 27, 2015.
Notice of Allowance for U.S. Appl. No. 14/192,767 dated Dec. 16, 2014.
Notice of Allowance for U.S. Appl. No. 14/278,963 dated Sep. 2, 2015.
Notice of Allowance for U.S. Appl. No. 14/451,221 dated Aug. 4, 2015.
Notice of Allowance for U.S. Appl. No. 14/504,103 dated May 18, 2015.
Notice of Allowance for U.S. Appl. No. 14/734,772 dated Apr. 27, 2016.
Notice of Allowance for U.S. Appl. No. 14/746,671 dated Jan. 21, 2016.
Official Communication for European Patent Application No. 14189344.6 dated Feb. 20, 2015.
Official Communication for European Patent Application No. 14199182.8 dated Mar. 13, 2015.
Official Communication for European Patent Application No. 15183721.8 dated Nov. 23, 2015.
Official Communication for European Patent Application No. 16173056.9 dated Nov. 3, 2016.
Official Communication for Netherlands Patent Application No. 2012436 dated Nov. 6, 2015.
Official Communication for U.S. Appl. No. 13/196,788 dated Oct. 23, 2015.
Official Communication for U.S. Appl. No. 13/196,788 dated Nov. 25, 2015.
Official Communication for U.S. Appl. No. 14/278,963 dated Jan. 30, 2015.
Official Communication for U.S. Appl. No. 14/451,221 dated Apr. 6, 2015.
Official Communication for U.S. Appl. No. 14/504,103 dated Mar. 31, 2015.
Official Communication for U.S. Appl. No. 14/504,103 dated Feb. 5, 2015.
Official Communication for U.S. Appl. No. 14/578,389 dated Oct. 21, 2015.
Official Communication for U.S. Appl. No. 14/578,389 dated Apr. 22, 2016.
Official Communication for U.S. Appl. No. 14/580,218 dated Jun. 26, 2015.
Official Communication for U.S. Appl. No. 14/726,211 dated Apr. 5, 2016.
Official Communication for U.S. Appl. No. 14/734,772 dated Jul. 24, 2015.
Official Communication for U.S. Appl. No. 14/734,772 dated Oct. 30, 2015.
Official Communication for U.S. Appl. No. 14/746,671 dated Nov. 12, 2015.
Official Communication for U.S. Appl. No. 14/746,671 dated Sep. 28, 2015.
Official Communication for U.S. Appl. No. 14/841,338 dated Feb. 18, 2016.

(56) References Cited

OTHER PUBLICATIONS

Official Communication for U.S. Appl. No. 14/996,179 dated May 20, 2016.

* cited by examiner

TIME-SERIES DATA STORAGE AND PROCESSING DATABASE SYSTEM

CROSS-REFERENCE TO RELATED APPLICATIONS

This application claims a priority benefit under 35 U.S.C. §119 to U.S. Provisional Patent Application No. 62/171,875, filed on Jun. 5, 2015, and titled "TIME-SERIES DATA STORAGE AND PROCESSING DATABASE SYSTEM," which is hereby incorporated by reference herein in its entirety.

TECHNICAL FIELD

The present disclosure relates to database systems that store and process data for display in an interactive user interface.

BACKGROUND

A database may store a large quantity of data. For example, a system may comprise a large number of sensors that each collect measurements at regular intervals, and the measurements may be stored in the database. The measurement data can be supplemented with other data, such as information regarding events that occurred while the system was operational, and the supplemental data can also be stored in the database.

In some cases, a user may attempt to analyze a portion of the stored data. For example, the user may attempt to analyze a portion of the stored data that is associated with a specific time period. In response, the user's device may retrieve the appropriate data from the database. However, as the quantity of data stored in the database increases over time, retrieving the appropriate data from the database and performing the analysis can become complicated and time consuming. Thus, the user may experience noticeable delay in the display of the desired data.

SUMMARY

The systems, methods, and devices described herein each have several aspects, no single one of which is solely responsible for its desirable attributes. Without limiting the scope of this disclosure, several non-limiting features will now be discussed briefly.

Disclosed herein is a database system that includes components for storing time-series data and executing custom, user-defined computational expressions in substantially real-time such that the results can be provided to a user device for display in an interactive user interface. For example, the database system may include memory storage, disk storage, and/or one or more processors. Data received from a data source may include value and timestamp pairs and, once written to disk, may be immutable. Thus, the database system may not overwrite a portion of the data or append additional data to the written data once the data is written to disk. Because the data is immutable, all data written to disk can be memory mapped given that the location of the data will not change.

The database system may process stored time-series data in response to requests from a user device. For example, the user may request to view time-series data by manipulating an interactive user interface. The request, received by the database system from the user device (possibly via a server), may include a start time, an end time, a period, and/or a computational expression. The start time and end time may correspond with a range of timestamp values for which associated time-series data values should be retrieved. The period may indicate, when analyzed in conjunction with the start time and end time, a number of data points requested by the user device for display in the interactive user interface. The computational expression may indicate an arithmetic (and/or other type of) operation, if any, that the user wishes to perform on one or more sets of time-series data. Example arithmetic operations include a sum, a difference, a product, a ratio, a zScore, a square root, and/or the like.

Once the database system receives the request, the database system may begin retrieving the appropriate time-series data and performing the indicated arithmetic (and/or other types of) operations via the one or more processors. Depending on the type of indicated operation(s) to be performed, the one or more processors may perform pointwise operations or sliding window operations. As described above, because the data files may be memory mapped, the one or more processors can access the data files from memory, rather than from disk, to perform the indicated operations. The database system described herein may then achieve better performance when generating the new data values as compared with conventional databases. Once all new data values have been generated, the database system may transmit the new data values to the user device (for example, via the server) for display in the interactive user interface.

DETAILED DESCRIPTION OF SPECIFIC EMBODIMENTS

Overview

Figure 1A:
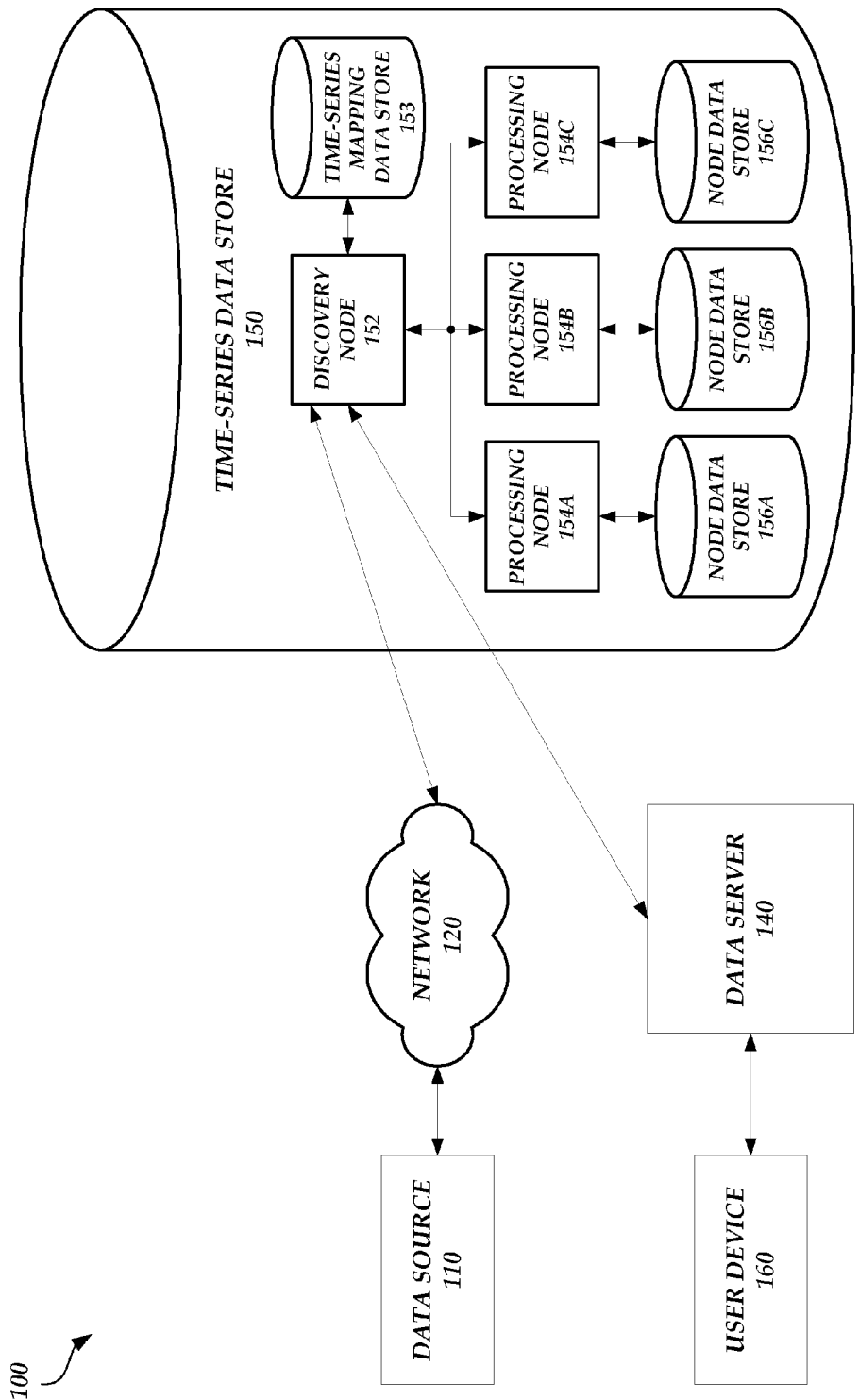
FIG. 1A illustrates a block diagram showing the various components of a time-series data storage and processing database system.

As described above, a user may attempt to analyze a portion of data stored in a database. For example, the user may attempt to analyze time-series data measured or captured by a data source. The user may attempt to analyze a single set of time-series data (for example, data measured or captured by a single data source over a period of time) or multiple sets of time-series data (for example, data measured or captured by different data sources over a period of time) at once. Such analysis may include viewing the time-series data at different periods of time, viewing the time-series data at different zoom levels, simultaneously viewing different time-series data over the same time period, combining (for example, adding, subtracting, dividing, multiplying, determining a ratio, determining a zScore, determining a square root, etc.) different time-series data to generate new time-series data, and/or the like.

Typically, a system that allows users to analyze the data stored in the database may include the database, a server, and a user device. The user device may provide information to the server regarding the type of analysis desired by the user. The server may retrieve the appropriate data from the database, perform the analysis, and provide the results to the user device for display. However, as the quantity of data stored in the database increases over time, there may be considerable delay in the retrieval of the data from the database by the server. For example, the database may take a longer period of time to search in memory or on disk for the desired data.

In addition, network issues may contribute to the data retrieval delay. For example, the server and the database may be in communication via a wired or wireless network. The bandwidth of the network may be limited such that data can only be streamed from the database to the server at certain speeds. This can be problematic and inefficient because the computational power of the server may be at a level high enough such that the server can finish analyzing a first portion of data before a second portion is received from the database. Because the data may not be transmitted from the server to the user device until all of the data has been analyzed, the user may notice a delay in the display of the desired data.

Thus, it may be desirable to co-locate the hardware components that store the data and the hardware components that execute the instructions to perform the analysis. For example, instead of having the server perform the analysis, the database could be configured to perform the analysis. In such a scenario, the database may retrieve the desired data from memory or disk, perform the analysis, and provide the results to the server. The server may then immediately forward the results to the user device for display.

While some conventional databases perform a basic level of computation, these databases may not be suitable for replacing the functionality of the server. For example, some conventional databases can generate generic statistics based on the stored data. Such statistics may describe attributes of the stored data, such as mean data values, time ranges over which stored data is available, and/or the like. Furthermore, the statistics may be organized over preset time periods, such as days, months, or years. However, these conventional databases are not configured to perform arbitrary or custom analyses or computations. Moreover, these conventional databases do not allow for organizing data over custom time periods. For example, these conventional databases are not designed to receive a computational expression generated by another device (such as the server or the user device), execute the received computational expression on only the portion of stored data identified by the other device, and provide the results. Thus, conventional databases may be inadequately designed to reduce or eliminate the inefficiencies described above.

Accordingly, disclosed herein is a database system that includes components for storing time-series data and executing custom, user-defined computational expressions in substantially real-time such that the results can be provided to a user device for display in an interactive user interface. For example, the database system may include memory storage, disk storage, and/or one or more processors. Data received from a data source may include value and timestamp pairs. When the data is initially received from a data source, the data may be written to a write ahead log that is stored in memory and/or written to disk (e.g., such that the write ahead log can be restored if the database system crashes or experiences a forced shutdown). Although the write ahead log may be written to disk, the write ahead log may not be immutable. The data may be written in the write ahead log in the order received from the data source rather than in an order based on the timestamp values. The database system may maintain a mapping that indicates what portion of the data stored in the write ahead log is in order according to the timestamp values and what portion of the data stored in the write ahead log is not in order according to the timestamp values. The write ahead log may have a size limit and once the size limit is reached or about to be reached (or some other criteria is met, such as the passage of a threshold period of time), the data in the write ahead log may be flushed and written to disk. Using the write ahead log as a buffer and only writing to disk periodically or aperiodically may reduce the overhead associated with writing to disk. When writing to disk, the database system may use the mapping to reorder the data such that the data is written to disk in an order according to the timestamp values.

Data from a single data source may be written to a single data file or may be written to multiple data files. If written to multiple data files and the two or more of the data files include overlapping timestamp values, the data may be merged before any computations are performed, as described in greater detail below. Alternatively, the two or more data files may be compacted prior to any computations to generate a new data file, and the new data file may be used for any subsequent computations. Compacting the data files may be more efficient because then a merge operation may not need to be performed each time the same data files with overlapping timestamp values are requested by the user device.

Data written to disk may be immutable. Thus, the database system may not overwrite a portion of the data or append additional data to the written data once the data is written to disk. Because the data is immutable, all data written to disk can be memory mapped (for example, a segment of virtual or non-virtual memory can be assigned a direct byte-for-byte or bit-for-bit correlation with at least a portion of a data file) given that the location of the data will not change. Memory mapping the data files may decrease data retrieval times, especially for large data files, because a read operation may not be necessary to access the data (for example, because the data can be stored directly in memory) and/or the database system may not need to copy the data retrieved from disk into memory before the data is usable.

The database system may process stored time-series data in response to requests from a user device. For example, the user may request to view time-series data by manipulating an interactive user interface. The request, received by the database system from the user device (possibly via a server), may include a start time, an end time, a period, and/or a computational expression. The start time and end time may correspond with a range of timestamp values for which associated time-series data values should be retrieved. The period may indicate, when analyzed in conjunction with the start time and end time, a number of data points requested by the user device for display in the interactive user interface. As an example, the period may correspond with a time period that falls within the width of a pixel, where the interactive user interface displays a time-series data value associated with the start time and a time-series data value associated with the end time N pixels apart (e.g., where N corresponds to the number of data points requested by the user device).

The computational expression may indicate an arithmetic operation, if any, that the user wishes to perform on one or more sets of time-series data. Example arithmetic operations include a sum, a difference, a product, a ratio, a zScore, a square root, and/or the like. For example, the user may wish to combine the values in two different sets of time-series data. Thus, the user device may generate a computational expression that indicates that an addition operation is to be performed on data values in the first time-series data set and in the second time-series data set that correspond with timestamp values that fall between the start time and the end time.

The computational expression may identify a single arithmetic operation or may identify a nested or recursive set of arithmetic (and/or other types of) operations. For example, the computational expression may indicate that data values in a first time-series data set are to be added to data values in a second time-series data set, and the result of the addition is to be subtracted from data values in a third time-series data set.

Once the database system receives the request, the database system may begin retrieving the appropriate time-series data and performing the indicated arithmetic (and/or other types of) operations via the one or more processors. Depending on the type of indicated operation(s) to be performed, the one or more processors may perform pointwise operations or sliding window operations. For example, if performing an addition operation, the one or more processors may take single data values from the same time-series data file or from different time-series data files and execute the operation on the single data values to generate a new data value. As another example, if performing a zScore operation, the one or more processors may take a window of data values (for example, a plurality of data values) and execute the operation on the window of data values taken as a whole to generate a new data value.

The one or more processors can perform the indicated operations on time-series data sets that have matching timestamp values. For example, the one or more processors can execute an operation on data values from different time-series data sets if the data values correspond to the same timestamp value. In some cases, however, the timestamp values from two or more different time-series data sets may not align. In such a situation, the one or more processors may perform interpolation to estimate data values that may correspond to any missing timestamp values. The interpolation may occur prior to executing the operation or during execution of the operation (for example, interpolation may occur once the one or more processors receives a data value for a timestamp not present in another time-series data set that is being processed).

As described above, time-series data originating from a single data source may be stored in multiple data files. If the multiple data files include overlapping ranges of timestamp values (e.g., a first data file includes timestamps at a first time, a second time, and a third time, and a second data file includes timestamps at the second time, the third time, and a fourth time), then the data values in the multiple data files may be merged by the one or more processors before executing the operation (if, for example, the multiple data files were not already compacted into a new data file as described above). For example, if data values in the multiple data files each correspond to the same timestamp value, then the one or more processors may choose a data value from a most-recently modified file (or least-recently modified file) as the data value to be used for the timestamp value when executing the operation. To delete one or more data values that correspond to the same timestamp value (even if the data files are otherwise immutable), a reserved value can be written in association with the timestamp value to indicate that the previously written data value at the timestamp value should be deleted.

Thus, the one or more processors may generate new data values by performing a sequential scan of existing time-series data. As described above, because the data files may be memory mapped, the one or more processors can access the data files from memory, rather than from disk, to perform the indicated operations. The database system described herein may then achieve better performance while performing the sequential scan to produce the new data values when compared with conventional databases. Once all new data values have been generated, the database system may transmit the new data values to the user device (for example, via the server) for display in the interactive user interface.

In an embodiment, the immutable status of the data files written to disk enables the database system to generate quick and efficient data backups. For example, because the data files are immutable, the stored location of the data files on disk will not change. If new data is received from a data source, the new data may be stored in a different data file on disk. Generally, backups include a copy of the actual data file. However, because the location of a data file will not change, the backup can include a link to the location of the data file rather than a copy of the actual data file itself. Thus, the database system described herein may generate backups faster than conventional databases given that the process of generating links may be faster than the process of copying actual data files.

Example System Overview

FIG. 1A illustrates a block diagram showing the various components of a time-series data storage and processing database system 100. As illustrated in FIG. 1A, the time-series data storage and processing database system 100 may include a data source 110, a data server 140, a time-series data store 150, and a user device 160.

In an embodiment, the data source 110 may be any computing or mechanical device that can determine, measure, and/or capture data values. For example, the data source 110 may be a sensor, such as a sensor that measures physical parameters, a financial system, a medical electronic records system, and/or the like. While FIG. 1A illustrates a single data source 110, this is not meant to be limiting. The time-series data storage and processing database system 100 may include any number of data sources 110.

The data source 110 may transmit determined, measured, and/or captured time-series data to the time-series data store 150. In an embodiment, the data source 110 and the time-series data store 150 communicate via a network 120. The network 120 may include any communications network, such as the Internet. The network 120 may be a wired network, a wireless network, or a combination of the two. For example, network 120 may be a local area network (LAN) and/or a wireless area network (WAN). The network 120 may include cables and/or other equipment that allow the transport of data from underwater locations to above-ground locations and/or vice-versa.

The time-series data store 150 may store time-series data received from the data source 110 and perform analyses on the stored data based on requests received from the user device 160 via the data server 140. For example, as illustrated in FIG. 1, the time-series data store 150 may include a discovery node 152, a time-series mapping data store 153, processing nodes 154A-C, and node data stores 156A-C. The discovery node 152 can be a single node or a cluster of nodes. Three processing nodes 154A-C and node data stores 156A-C are depicted for illustrative purposes only and is not meant to be limiting. The time-series data store 150 may include any number of processing nodes and/or node data stores.

In some embodiments, the time-series data received from various data sources 110 may be stored in different node data stores 156A-C. The time-series mapping data store 153 may store a mapping that identifies the processing node 154A-C that is associated with a time-series data set (and thus the node data store 156A-C in which the time-series data set is stored). When time-series data is received by the time-series data store 150 from a data source 110, the discovery node 152 may receive the time-series data, communicate with the time-series mapping data store 153 to determine the processing node 154A-C associated with the time-series data, and transmit the time-series data to the appropriate processing node 154A-C. Alternatively, the data source 110 can cache information indicating the processing node 154A-C that is associated with a time-series data set such that the data source 110 can transmit the time-series data directly to the appropriate processing node 154A-C. The processing node 154A-C may then store the received time-series data in the associated node data store 156A-C (after, for example, the write ahead log of the processing node 154A-C is flushed, as described in greater detail below with respect to FIG. 1B).

Likewise, when a user device 160 or data server 140 provides a computational expression to the time-series data store 150, the discovery node 152 may analyze the computational expression to identify the time-series data upon which an arithmetic (and/or other type of) operation may be performed. The discovery node 152 may communicate with the time-series mapping data store 153 to identify the processing node(s) 154A-C associated with the identified time-series data. The computational expression, along with the start time, the end time, and the period, may be transmitted to the processing node 154A that is associated with the identified time-series data. Alternatively, the user device 160 or data server 140 can cache information indicating the processing node 154A-C that is associated with a time-series data set such that the user device 160 or data server 140 can analyze the computational expression to identify the time-series data upon which the arithmetic (and/or other type of) operation may be performed and transmit the computational expression, along with the start time, the end time, and the period, directly to the appropriate processing node 154A-C. If the computational expression identifies a plurality of time-series data sets that are associated with different processing nodes 154A-C, then the discovery node 152 may select one of the processing nodes 154A-C to perform the arithmetic operation(s). The selected processing node 154A-C may retrieve time-series data from another processing node 154A-C (for example, time-series data that is not associated with the selected processing node 154A-C) in order to perform the arithmetic operation(s). While the description herein refers to "arithmetic operations" for simplicity, any other type of mathematical operation may similarly be performed on the time-series data.

A processing node 154A-C may use the start time, the end time, the period (for example, a value that identifies a duration of time), and the computational expression to manipulate time-series data and/or to generate new time-series data. For example, the processing node 154A-C may perform the arithmetic operation(s) identified by the computational expression on the time-series data identified by the computational expression for data values in the time-series data that correspond with timestamp values that fall between the start time and the end time (interpolating when necessary as described herein). If the period of time between each timestamp value is less than the period received from the user device 160 or data server 140, then the processing node 154A-C may aggregate data values (for example, average, sum, subtract, minimum, maximum, etc.) after (or prior to) applying the arithmetic operation(s) such that the number of data values equals the number of periods between the start time and the end time. For example, if the start time is 1:00 pm, the end time is 1:01 pm, the period is 10 seconds, and the timestamp values of a time-series data set increment every 1 second, then the period of time between each timestamp value (for example, 1 second) is less than the period (for example, 10 seconds) and the number of periods between the start time and the end time is 6. The processing node 154A-C may aggregate data values corresponding to the first 10 timestamp values (for example, data values corresponding to times 1:00:01 pm through 1:00:10 pm), the second 10 timestamp values (for example, data values corresponding to times 1:00:11 pm through 1:00:20 pm), and so on until the processing node 154A-C has generated 6 aggregated data values. The processing node 154A-C may repeat this process for each identified time-series data set. In some cases, a single time-series data set may not have a fixed period between data values. Thus, the processing node 154A-C may aggregate a portion of data values (e.g., the portion of data values for which the period of time between each timestamp value is less than the period received from the user device 160 or data server 140). In some embodiments, the processing node 154A-C performs the arithmetic operation(s) before aggregating the data values. In other embodiments, the processing node 154A-C performs the arithmetic operation(s) using the aggregated data values.

As described herein, the processing nodes 154A-C can perform pointwise operations and/or sliding window operations. When performing pointwise operations, the processing nodes 154A-C may apply the arithmetic operation(s) on single data values (for example, data values corresponding to the same timestamp value). When performing sliding window operations, the processing nodes 154A-C may apply the arithmetic operation(s) on a window of data values (for example, data values corresponding to a range of timestamp values).

Once the arithmetic operation(s) identified by the computational expression are applied to the appropriate data values, the processing nodes 154A-C may aggregate the results into a new time-series data set. The new time-series data set may be stored in the associated node data store 156A-C. Alternatively or in addition, the new time-series data set may be transmitted to the data server 140 (which then forwards the new time-series data set to the user device 160) and/or the user device 160.

In some embodiments, the computational expression includes no arithmetic operations to be performed. For example, this may occur if the user scrolls or pans within a time-series data set displayed in the interactive user interface, thus requesting to view time-series data that was not previously visible within the interactive user interface. In such a situation, the processing nodes 154A-C may not generate new time-series data, but may instead retrieve and provide a different set of data values than was previously provided for display in the interactive user interface.

The data server 140 may receive requests from the user device 160 (for example, the computational expression, the start time, the end time, and the period) and forward such requests to the time-series data store 150. The data server 140 may also receive updated time-series data and/or new time-series data from the time-series data store 150 and forward such data to the user device 160 for display in the interactive user interface.

The data server 140 may be implemented as a special-purpose computer system having logical elements. In an embodiment, the logical elements may comprise program instructions recorded on one or more machine-readable storage media. Alternatively, the logical elements may be implemented in hardware, firmware, or a combination thereof. In one embodiment, the data server 140 may be implemented in a Java Virtual Machine (JVM) that is executing in a distributed or non-distributed computer system. In other embodiments, the data server 140 may be implemented as a combination of programming instructions written in any programming language (e.g. C++, Visual Basic, Python, etc.) and hardware components (e.g., memory, CPU time) that have been allocated for executing the program instructions.

The user device 160 may transmit requests for updated or new time-series data to the data server 140 for transmission to the time-series data store. Such requests may include the start time, the end time, the period, and/or the computational expression. The requests may be generated in response to the manipulation of the interactive user interface by a user. Manipulations may include panning, scrolling, zooming, selecting an option to modify, combine and/or aggregate one or more time-series data sets to produce a new time-series data set, and/or the like. For example, the user may be viewing, via the interactive user interface, a first time-series data set that illustrates a first physical parameter (e.g., temperature) associated with a component and a second time-series data set that illustrates a second physical parameter (e.g., humidity) associated with the component. The user may then select an option to view the values of the first and second physical parameters associated with the component. Selection of this option may cause the user device 160 to generate a computational expression that identifies the first time-series data set, the second time-series data set, and an arithmetic operation (for example, addition). The selection may also cause the user device 160 to identify the start time and the end time, which can be user-defined and/or based on an earliest timestamp value and a latest timestamp value currently viewable in the interactive user interface. The selection may also cause the user device 160 to identify the period, which may be user-defined and/or may be the range of time between the start time and the end time that corresponds with the width of a pixel. The range of time may be determined based on the zoom level of a graph depicting time-series data. Thus, the period may be dependent on the number of pixels in the horizontal direction (if time is along the x-axis) or vertical direction (if time is along the y-axis) that are devoted to displaying the requested time-series data.

Once updated or new time-series data is received from the data server 140 and/or directly from the time-series data store 150, the user device 160 may update user interface data used by the user device 160 to render and display the interactive user interface to display the data and timestamp value pairs. In other embodiments, the data server 140 may update the user interface data and provide the updated user interface data to the user device 160.

The user device 160 can include a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances. The user devices 160 may execute a browser application to communicate with the data server 140.

Figure 1B:
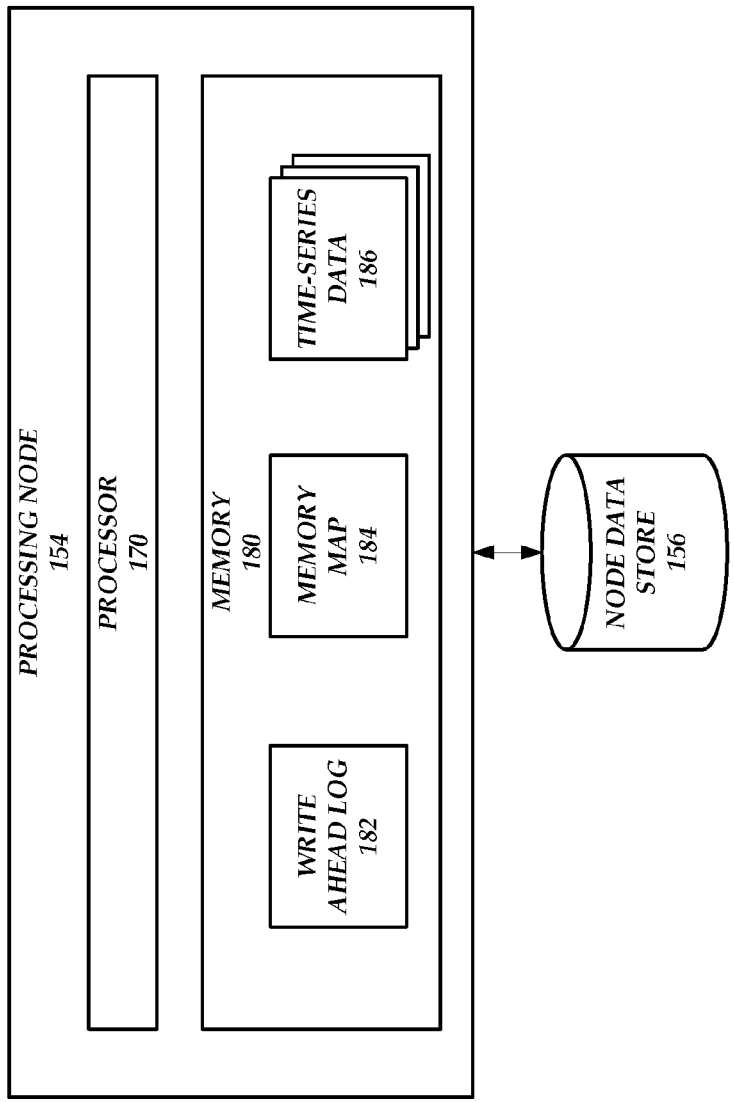
FIG. 1B illustrates a more detailed block diagram of a processing node, such as a processing node of FIG. 1A.

FIG. 1B illustrates a more detailed block diagram of a processing node, such as a processing node 154A-C of FIG. 1A. As illustrated in FIG. 1B, the processing node 154 may include a processor 170 and memory 180. While a single processor 170 is depicted, this is not meant to be limiting. The processing node 154 may include any number of processors 170. The processor 170 may retrieve time-series data from the memory 180 and/or the node data store 156 to perform requested arithmetic operation(s).

The memory 180 may store a write ahead log 182, a memory map 184, and one or more time-series data files 186. For example, as described herein, when time-series data is initially received from the data source 110, the processing node 154 may initially store the received time-series data in the write ahead log 182. The time-series data may be written in the write ahead log 182 in the order received from the data source 110 rather than in an order based on the timestamp values in the time-series data. The processing node 154, in the memory 180 or in another hardware component, may maintain a mapping that indicates what portion of the time-series data stored in the write ahead log 182 is in order according to the timestamp values and what portion of the time-series data stored in the write ahead log 182 is not in order according to the timestamp values. For example, the first four entries in the write ahead log 182 may be in order according to timestamp values and the second four entries in the write ahead log 182 may be in order according to timestamp values. However, the first four entries and the second four entries may not be in order according to timestamp values.

The write ahead log 182 may have a data size limit and once the size limit is reached or about to be reached (or some other criteria is met, such as the passage of a threshold period of time), the time-series data in the write ahead log 182 may be flushed and written to disk (for example, the node data store 156). When writing to disk, the processing node 154 may use the mapping to reorder the time-series data such that the time-series data is written to disk in an order according to the timestamp values. For example, using the example above, the processing node 154 may reorder the first four entries and the second four entries such that all eight entries are written to disk in an order according to the timestamp values.

The memory map 184 may identify the segments of the memory 180 that are assigned to at least a portion of a data file of a time-series (for example, the time-series data files 186). The memory 180 may use the memory map 184 to identify the location of at least a portion of the time-series data files 186 requested by the processor 170. As described herein, the use of the memory map 184 may decrease data retrieval times, especially for large time-series data files, because a read operation on the node data store 156 may not be necessary to access the time-series data (for example, because the time-series data can be stored directly in the memory 180) and/or the processing node 154 may not need to copy the time-series data retrieved from the node data store 156 into the memory 180 before the data is usable. For example, the processor 170 may request a data value stored in a particular page of a time-series data file. An expectation may be that the processor 170 may then subsequently request another data value that follows the initial data value or that is within a range of the initial data value, where both data values are stored in the same page or in contiguous pages. Thus, by loading at least a portion (e.g., at least a page) of a time-series data file 186 into memory 180, a read operation on the node data store 156 may not be necessary.

The time-series data files 186 may be stored in the memory 180 (for example, after the time-series data files have been written to the node data store 156). Alternatively, a portion of the time-series data files 186 may be stored in the memory 180, such as one or more pages of a respective time-series data file 186. The operating system of the processing node 154 may determine if or when to perform read operations to pull data from the node data store 156 into the memory 180.

Example State Diagrams

Figure 2A:
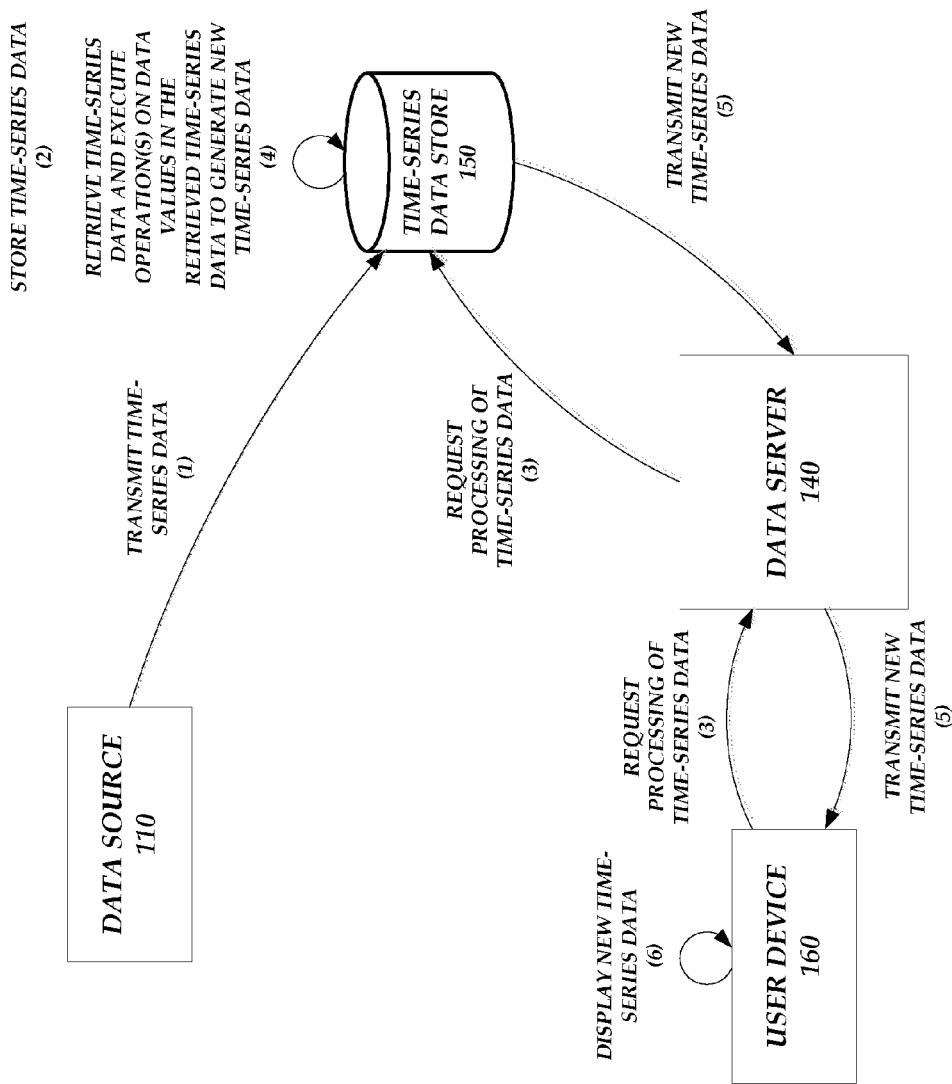
FIGS. 2A-2C illustrate example state diagrams that depict the process of retrieving and manipulating time-series data.
Figure 2B:
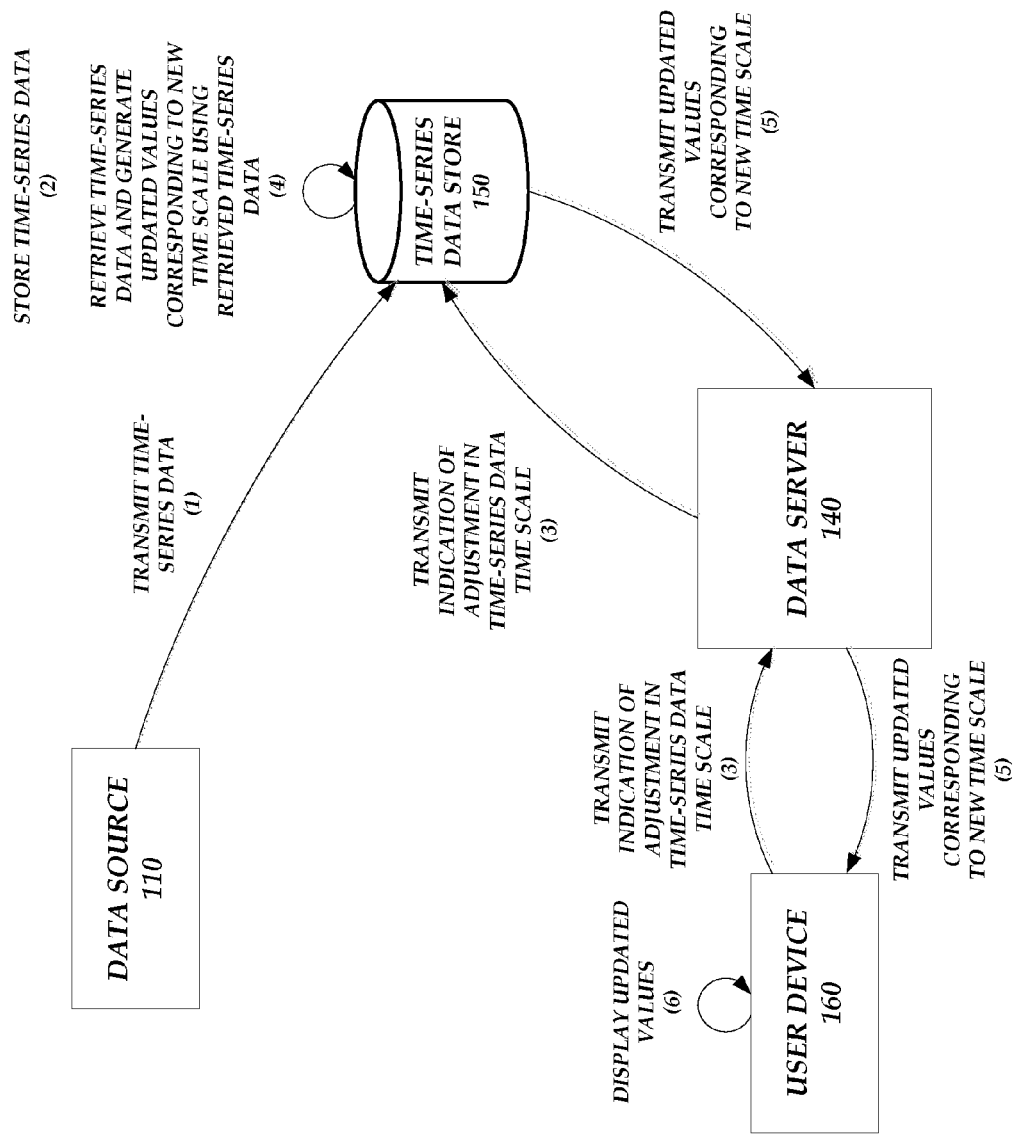
Figure 2C:
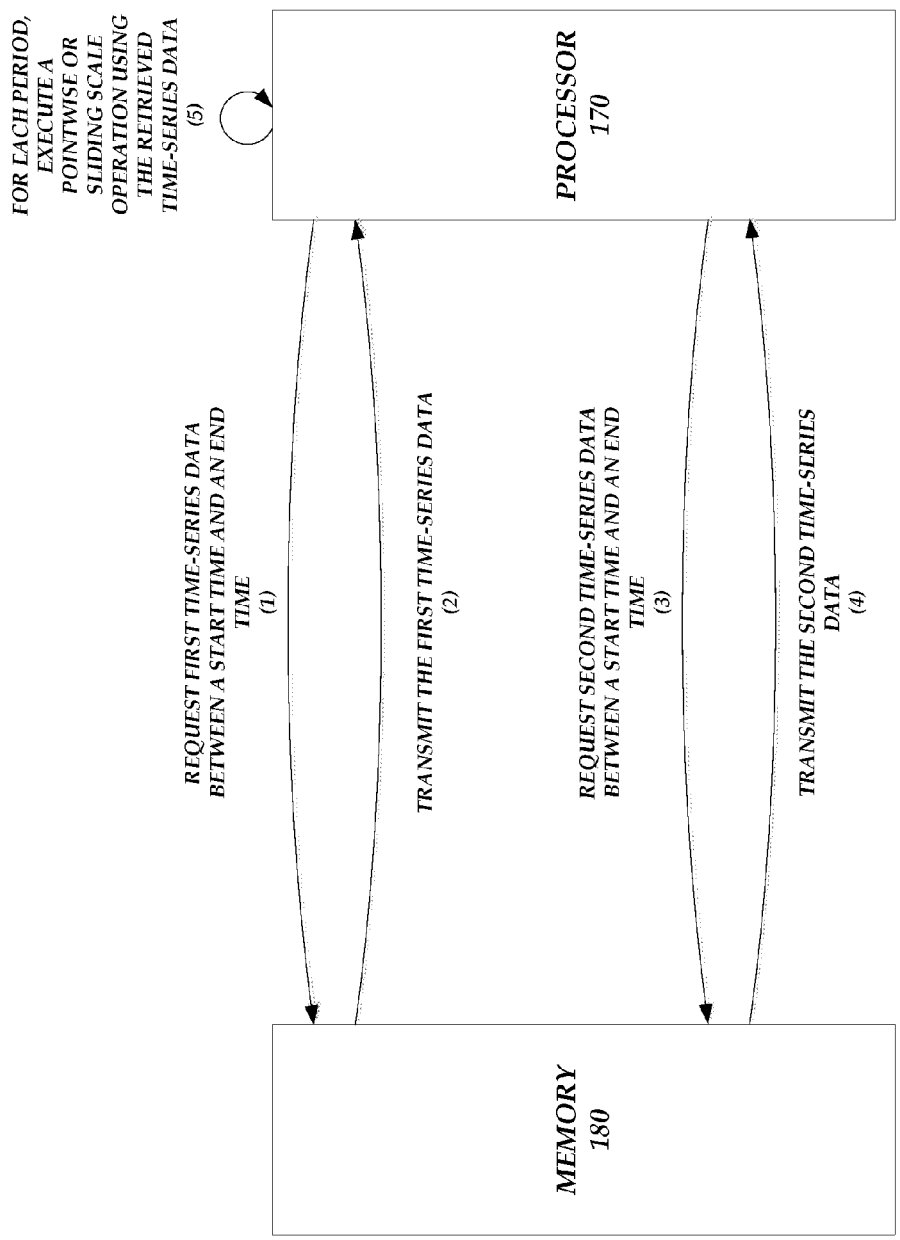

FIGS. 2A-2C illustrate example state diagrams that depict the process of retrieving and manipulating time-series data. As illustrated in FIG. 2A, the data source 110 may transmit time-series data (1) to the time-series data store 150. The time-series data store 150 may store the time-series data (2). Once written to disk, the file including the time-series data may be immutable.

At some time after the time-series data is stored in the time-series data store 150, a user may manipulate the interactive user interface displayed by the user device 160 in a way that causes the user device 160 to request processing of time-series data (3) from the data server 140. For example, the user may pan, scroll, zoom, select an option to modify, combine, and/or aggregate time-series data, and/or the like. The request may include the start time, the end time, the period, and/or the computational expression.

The data server 140 may forward the request to the time-series data store 150. Using information in the request, the time-series data store 150 may retrieve time-series data identified in the computational expression and execute arithmetic operation(s) on data values in the retrieved time-series data to generate new time-series data (4). Execution of the arithmetic operation(s) may involve pointwise operations and/or sliding window operations.

The time-series data store 150 may transmit the new time-series data (5) to the data server 140. The data server 140 may then forward the new time-series data to the user device 160. In some embodiments, the data server 140 aggregates the new time-series data into a different format (e.g., a format more understandable by humans, a format that can be more easily displayed by the user device 160, etc.) before forwarding the new time-series data to the user device 160. The user device 160 may display the new time-series data (6) in the interactive user interface.

The state diagram depicted in FIG. 2B is similar to the state diagram depicted in FIG. 2A. However, the user manipulation of the interactive user interface displayed by the user device 160 may cause the user device 160 to transmit an indication of an adjustment in the time-series data time scale (3). For example, such manipulation may include panning a graph displayed in the interactive user interface, scrolling through the graph displayed in the interactive user interface, and/or changing a zoom level depicted in the graph displayed in the interactive user interface. The indication may include the start time, the end time, the period, and/or the computational expression.

The indication may be received by the data server 140 and forwarded to the time-series data store 150. Using information in the indication, the time-series data store 150 may retrieve time-series data identified in the computational expression and generate updated values corresponding to the new time scale using the retrieved time-series data (4). For example, the time-series data store 150 may generate the updated values by executing arithmetic operation(s) on data values in the retrieved time-series data.

The time-series data store 150 may transmit the updated values corresponding to the new time scale (5) to the data server 140. The data server 140 may then forward the updated values to the user device 160. The user device 160 may display the updated values (6) in the interactive user interface.

FIG. 2C illustrates an example state diagram depicting the processes performed by a processing node 154 in the time-series data store 150 when analyzing and performing the computational expression (for example, steps (4) in FIGS. 2A-2B). For example, the processor 170 may request first time-series data between a start time and an end time (1) from the memory 180. The memory 180 may then transmit the first time-series data (2) to the processor 170.

Optionally, the processor 170 may request second time-series data between a start time and an end time (3) from the memory 180 (if, for example, the computational expression identifies the second time-series data). The memory 180 may then transmit the second time-series data (4) to the processor 170.

For each period, the processor 170 may execute a pointwise or sliding window operation using the retrieved time-series data (5). The processor 170 (with or without the use of the memory 180 or additional memory to store intermediate states) may execute a pointwise or sliding window operation based on the type of arithmetic operation identified in the computational expression. For example, the processor 170 may execute a pointwise operation if the arithmetic operation is addition and the processor 170 may execute a sliding window operation if the arithmetic operation is a moving average.

Example Interactive User Interfaces

Figure 3A:
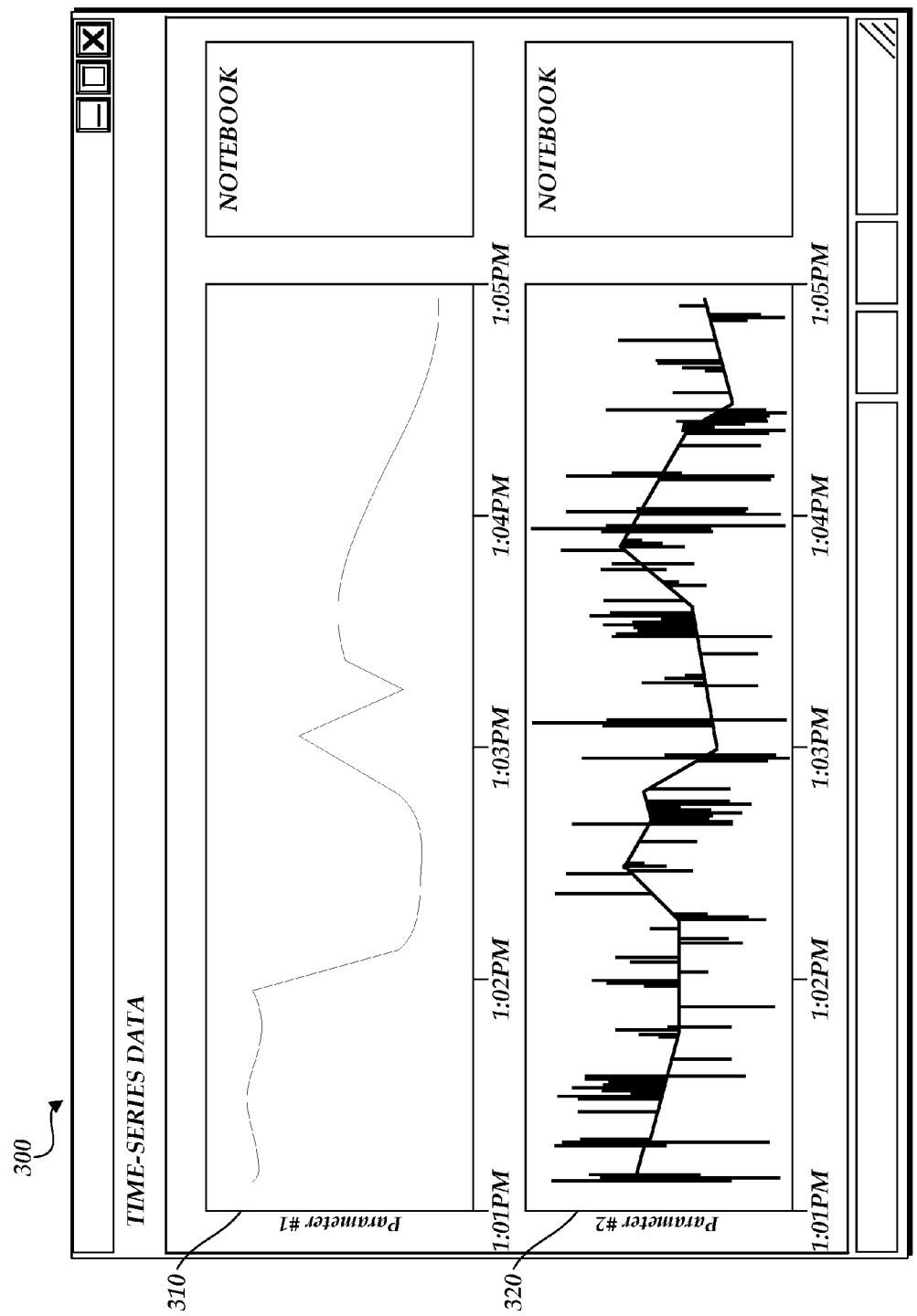
FIGS. 3A-3B illustrate an interactive user interface depicting graphs of time-series data that may be generated and displayed by a user device, such as the user device of FIG. 1A.
Figure 3B:
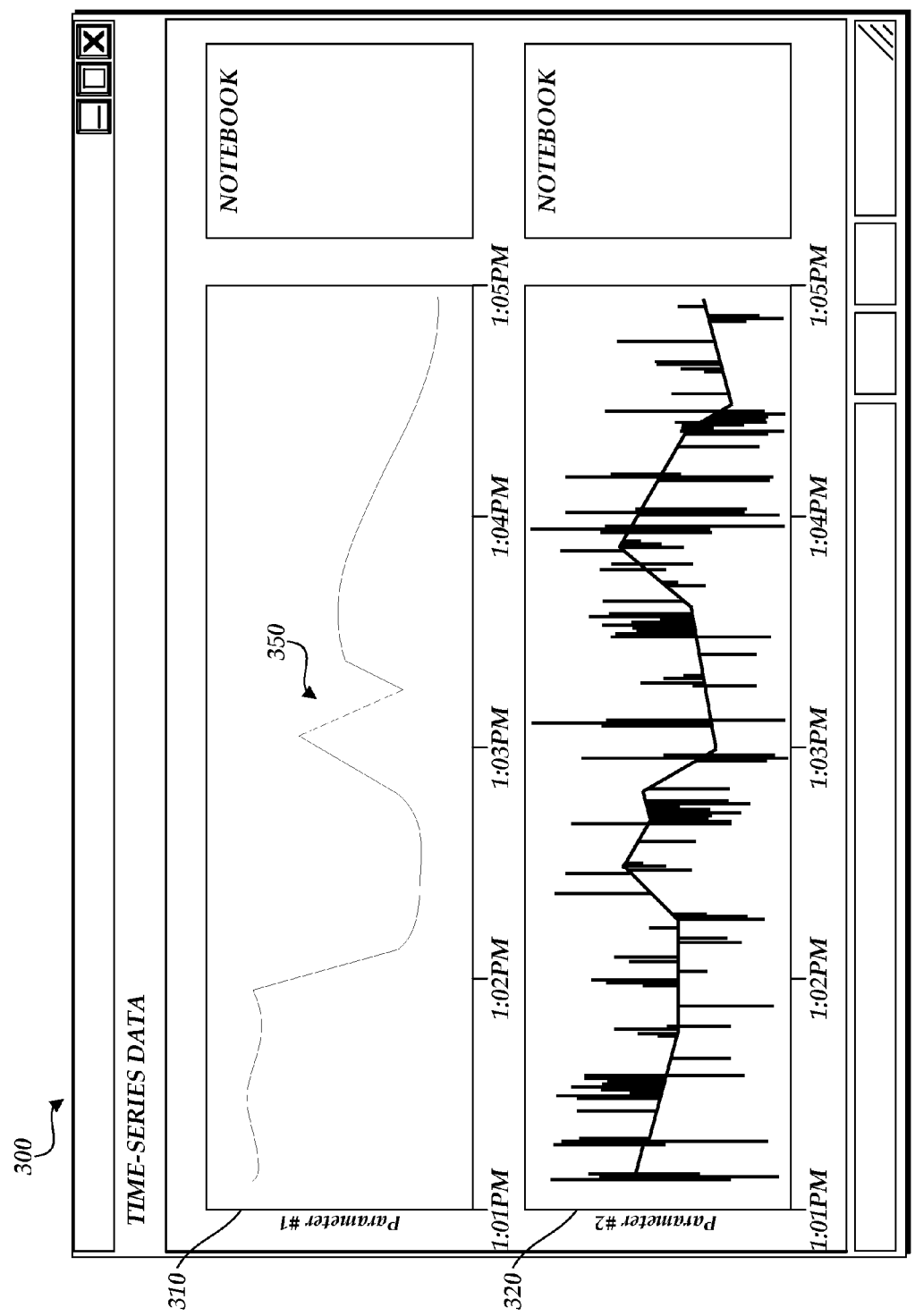

FIGS. 3A-3B illustrate an interactive user interface 300 depicting graphs of time-series data that may be generated and displayed by a user device, such as the user device 160. As illustrated in FIG. 3A, the interactive user interface 300 includes a graph 310 displaying time-series data showing water allocation values over time and a graph 320 displaying time-series data showing temperature values over time.

If, for example, the user manipulates the graph 310, then the user device 160 may generate a start time, an end time, a period, and a computational expression to transmit to the time-series data store 150. The start time may be 1:01 pm and the end time may be 1:05 pm given that these times correspond with the earliest timestamp and the latest timestamp visible in the interactive user interface 300. The number of pixels in the horizontal direction between a data value corresponding to the earlier timestamp and a data value corresponding to the latest timestamp may dictate the value of the period. For example, if 240 pixels exist between these two data points, then the period may be 1 second (for example, there may be 240 seconds between 1:05 pm and 1:01 pm and thus each pixel may correspond to 1 second).

The computational expression may identify the time-series data set displayed in the first graph 310. The computational expression may also identify the time-series data set displayed in the second graph 320 if, for example, the user selects an option to view a time-series data set that comprises some combination (for example, addition, subtraction, ratio, etc.) of the time-series data sets displayed in the graphs 310 and 320. Finally, the computational expression may also identify any arithmetic operation(s) to be performed.

As illustrated in FIG. 3B, portion 350 in the graph 310 includes gaps in data values. For example, data values in the gaps may not have been stored in the time-series data store 150. If the user desired to view a time-series data set that comprised some combination of the time-series data sets in the graphs 310 and 320, then the time-series data store 150 may use interpolation to estimate possible data values associated with the timestamp values in which data is missing. The interpolated data, along with the actual stored data, may then be used to generate the new time-series data set.

Figure 3C:
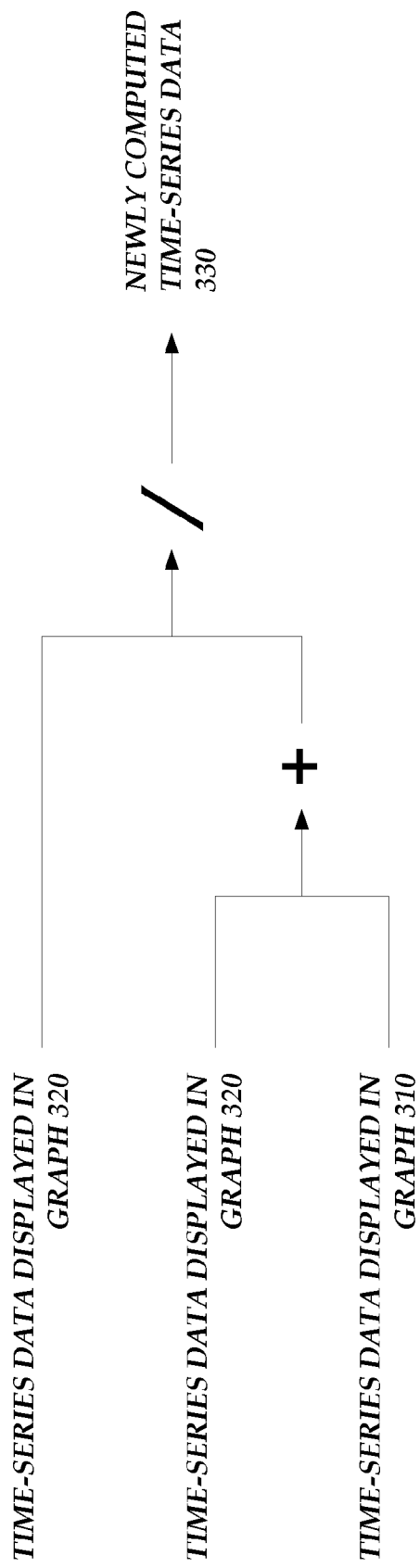
FIG. 3C illustrates an example nested set of arithmetic operations.

As described herein, the computational expression may include a nested set of arithmetic operations. FIG. 3C illustrates an example nested set of arithmetic operations. As illustrated in FIG. 3C, a first arithmetic operation may include the addition of data values from the time-series data displayed in the graph 310 with data values from the time-series data displayed in the graph 320. The second arithmetic operation may include the division of data values from the time-series data displayed in the graph 320 over the results from the first arithmetic operation. A computed set of time-series data 330 is output as a result of the computational expression. The computed set of time-series data 330 may then be displayed to the user in one of the graphs 310 or 330, and/or another graph of the user interface. While two arithmetic operations are depicted, this is not meant to be limiting. A computational expression may include any number of nested or un-nested arithmetic operations. Further, while, for clarity of description, FIG. 3C illustrates a computational expression performed on displayed time series data, in other embodiments computational expressions are performed on time-series data that may not be displayed. For example, the user may request a display of a graph of time-series data that may only be produced by execution of a computational expression on two or more time-series of data. As a result, the system may automatically access the necessary time-series of data (as described above and below), execute the computational expression (as described above and below), and then provide the requested time-series date for display to the user (e.g., to the user device, as described above).

Example Data Directory

Figure 4A:
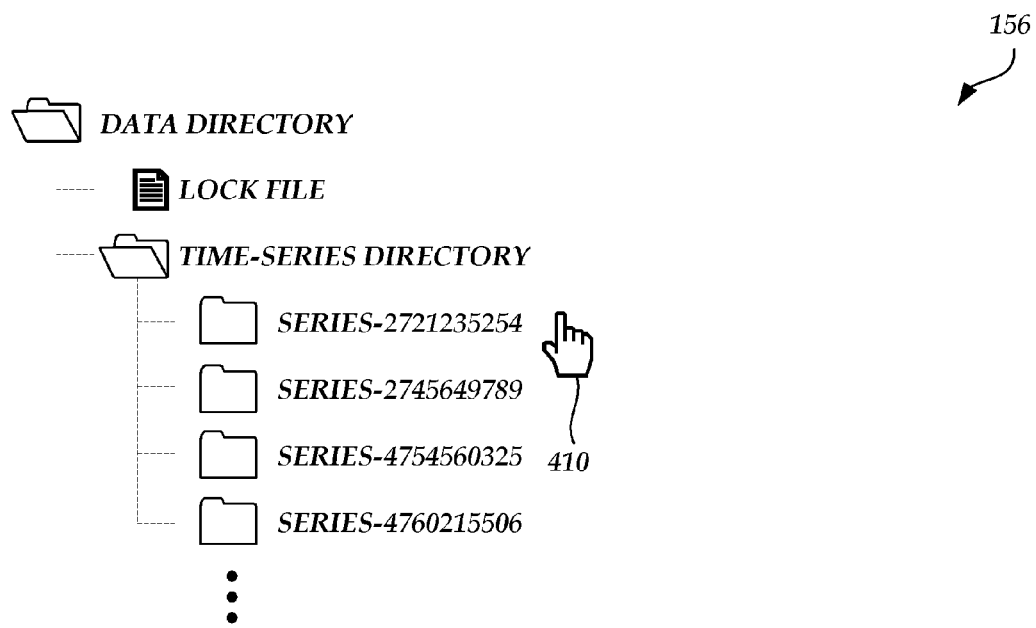
FIGS. 4A-4C illustrate an example file structure as stored in a node data store, such as a node data store of FIG. 1B.
Figure 4B:
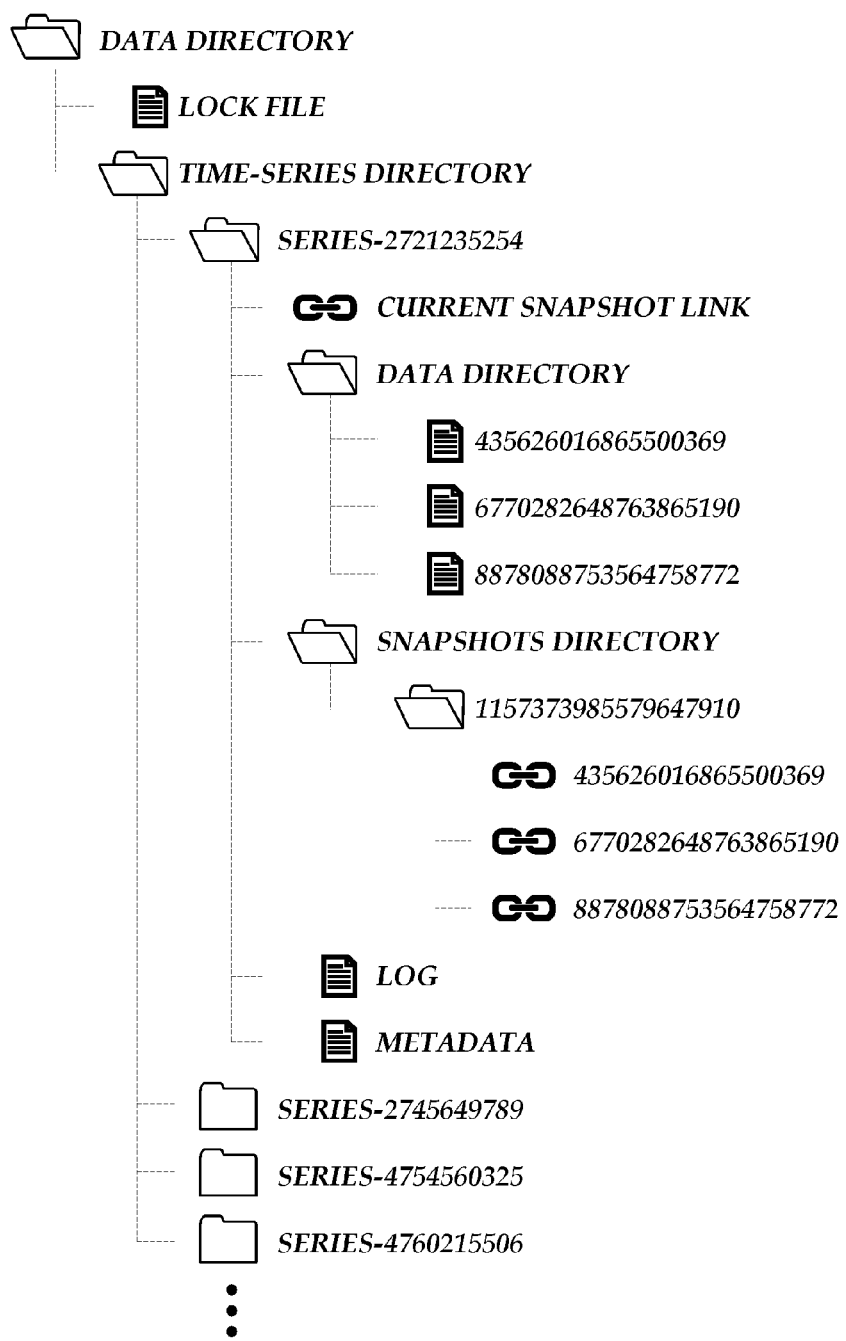
Figure 4C:

FIGS. 4A-4C illustrate an example file structure as stored in a node data store, such as a node data store 156A-C. As illustrated in FIG. 4A, a data directory may include a lock file and a time-series directory. The lock file may be used to prevent another instance from writing and/or reading from the data directory when a write operation is occurring. The time-series directory may include one or more subfolders that are each associated with a time-series data set.

For example, using cursor 410, subfolder series-2721235254 may be selected. Selection of the subfolder displays additional links, files, and subdirectories that may be representative of the contents of the other time-series directory subfolders, as illustrated in FIG. 4B. Series-2721235254 may include a data directory that includes one or more time-series data files, where the time-series data files may be immutable. While the series-2721235254 subfolder may correspond to a single time-series data set, the data may be separated into separate files. In some cases, the different time-series data files may include overlapping timestamp values. In such a situation, the processing node 154 may perform a merge operation as the data is used when executing arithmetic operation(s). For example, when the processing node 154 comes across a timestamp value corresponding to two or more different values, the processing node 154 may select the data value from the most-recently modified file (or the least-recently modified file) as the data value to use in computations. A special value (e.g., a reserved value) may be written at the time of the data value that is not selected to be used in computations. The special value will eventually be removed once the time-series data files are compacted. Alternatively, the processing node 154 may compact two or more time-series data files to generate a single new time-series data file in which overlapping timestamp value issues are resolved (for example, the new time-series data file includes a single data value for each timestamp value, where the data value is determined in a manner as described above). The new time-series data file may then be used in future computations in place of the original time-series data files used to generate the new time-series data file.

Series-2721235254 may also include a current snapshot link that links to the snapshots directory. The snapshots directory can be a staging location for an in-progress snapshot when a time-series data file is being added or compacted. As described above, the time-series data files may be immutable and thus the location in the node data store 156 is unchanged. Thus, the snapshots directory may include links, rather than actual copies of data. Each of the links in the snapshots directory may link to the time-series data file identified by the name of the link. The state of a time-series can be changed with a single file system operation (e.g., a single atomic file system operation) to change a current snapshot link associated with the time-series.

Series-2721235254 may also include a log file, which may be the write ahead log described herein. Series-2721235254 may also include a metadata file that includes key-value pairs about the time-series. For example, the information in the metadata file may include a Unicode identification of the time-series and an indication of whether the data values are stored as floats or doubles.

Raw data 450 received from a data source 110 and stored in the time-series data files may be in the form of data and timestamp value pairs, as illustrated in FIG. 4C. The data values may be stored as integers, floats, doubles, and/or the like. The timestamp values may be absolute values (for example, wall clock time) or relative values (for example, the amount of time that has passed since the last data value was measured). The data and/or timestamp values can be compressed prior to storage in the time-series data files. The time-series data files or a separate file may further include an index indicating the location of the compressed data and/or timestamp values.

Example Process Flows

Figure 5A:
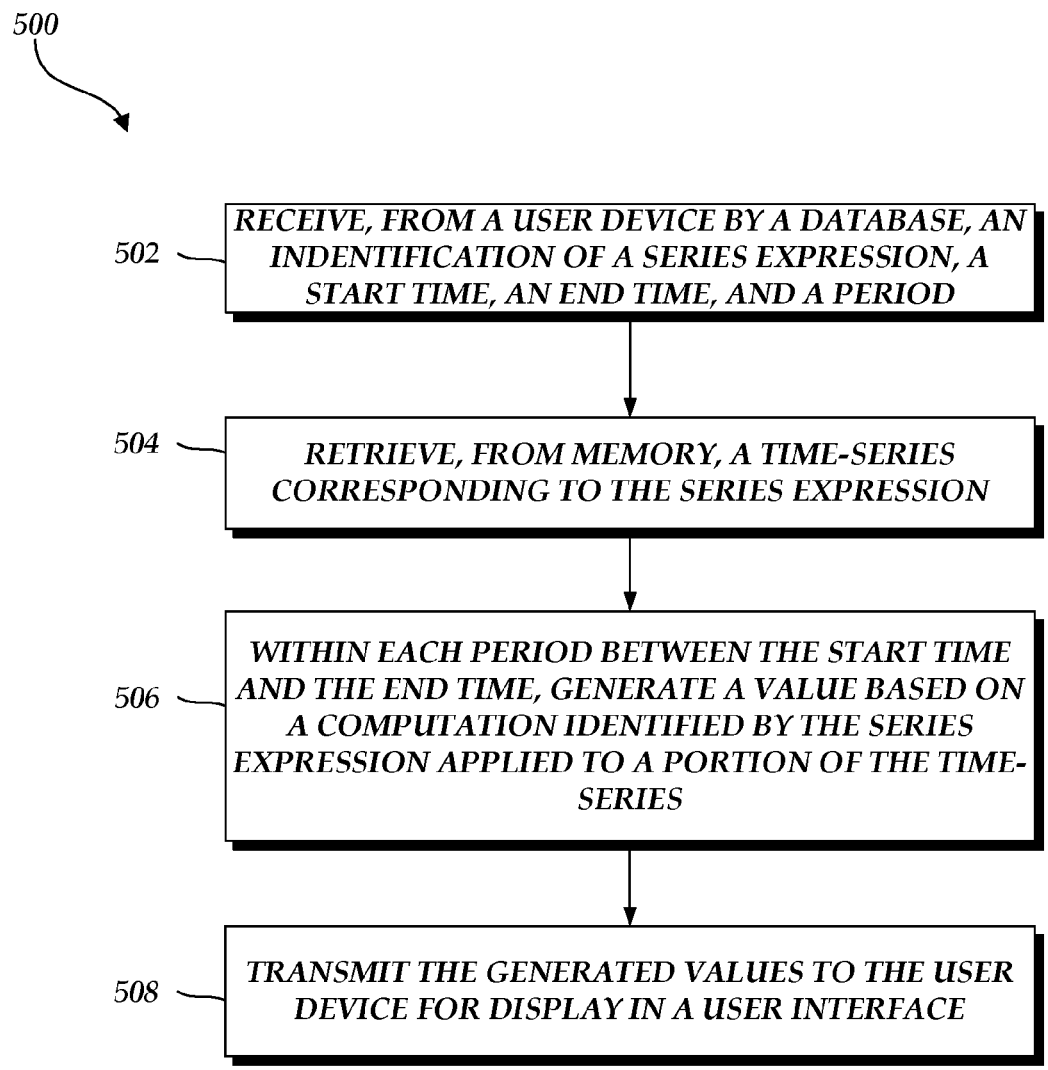
FIG. 5A is a flowchart depicting an illustrative operation of processing time-series data by a database for display in an interactive user interface.

FIG. 5A is a flowchart 500 depicting an illustrative operation of processing time-series data by a database for display in an interactive user interface. Depending on the embodiment, the method of FIG. 5A may be performed by various computing devices, such as by the time-series data store 150 described above. Depending on the embodiment, the method of FIG. 5A may include fewer and/or additional blocks and the blocks may be performed in an order different than illustrated.

In block 502, an identification of a series expression, a start time, an end time, and a period may be received from a user device. For example, the series expression may be a computational expression. The series expression may identify one or more arithmetic operations and one or more time-series data sets upon which the arithmetic operations are to be performed.

In block 504, a time-series data file corresponding to the series expression may be retrieved from memory. The time-series data file may be a data file associated with a time-series data set identified by the series expression.

In block 506, within each period between the start time and the end time, a value based on a computation identified by the series expression applied to a portion of the time-series data file is generated. For example, the computation may be one or more arithmetic operations. The computation may be applied to data values stored in the time-series data file that are associated with timestamp values that fall between the start time and the end time.

In block 508, the generated values may be transmitted to the user device for display in a user interface, such as an interactive user interface. In some embodiments, the generated values are also stored in the node data store 156.

Figure 5B:
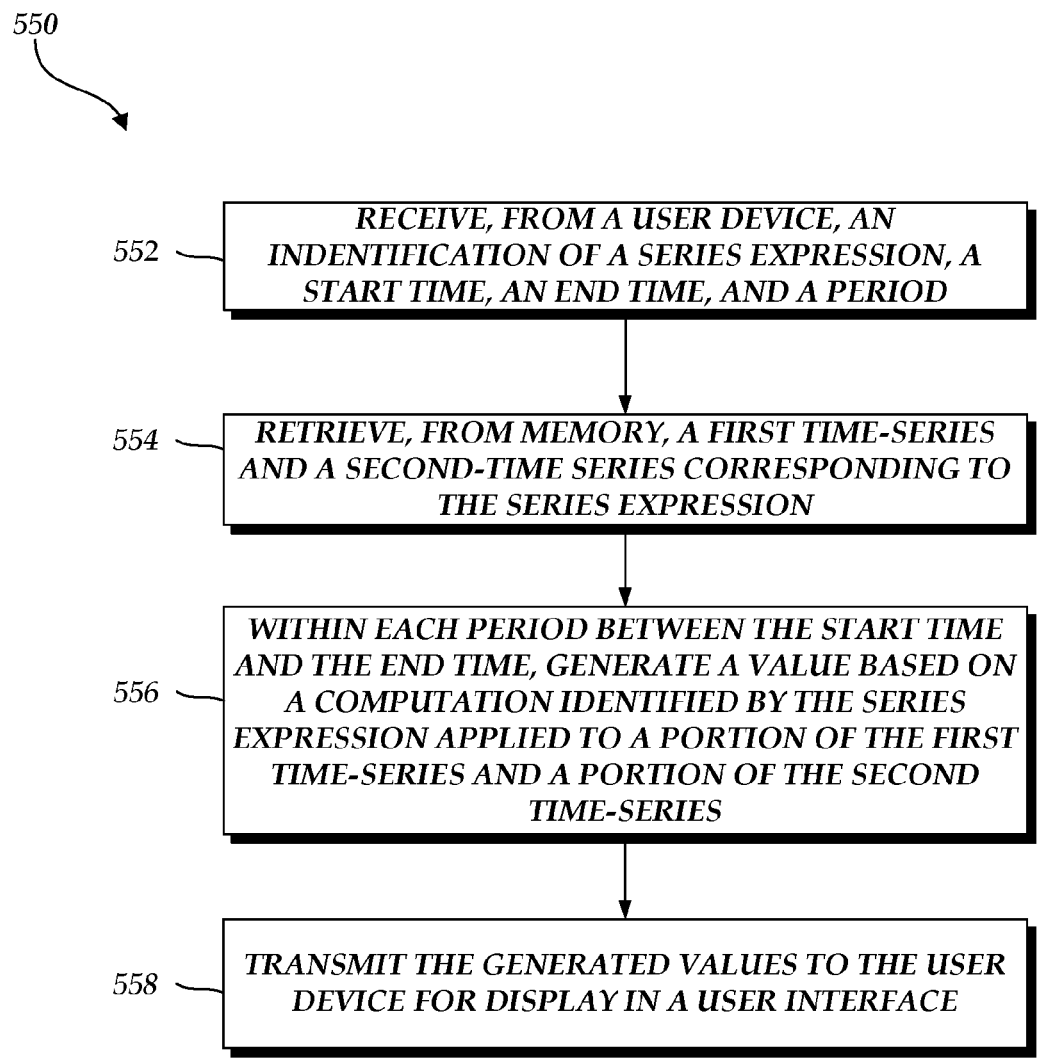
FIG. 5B is another flowchart depicting an illustrative operation of processing time-series data by a database for display in an interactive user interface.

FIG. 5B is another flowchart 550 depicting an illustrative operation of processing time-series data by a database for display in an interactive user interface. Depending on the embodiment, the method of FIG. 5B may be performed by various computing devices, such as by the time-series data store 150 described above. Depending on the embodiment, the method of FIG. 5B may include fewer and/or additional blocks and the blocks may be performed in an order different than illustrated.

In block 552, an identification of a series expression, a start time, an end time, and a period may be received from a user device. For example, the series expression may be a computational expression. The series expression may identify one or more arithmetic operations and one or more time-series data sets upon which the arithmetic operations are to be performed.

In block 554, a first time-series data file and a second time-series data file corresponding to the series expression may be retrieved from memory. The time-series data files may be a data files associated with time-series data sets identified by the series expression.

In block 556, within each period between the start time and the end time, a value based on a computation identified by the series expression applied to a portion of the first time-series data file and a portion of the second time-series data file is generated. For example, the computation may be one or more arithmetic operations. The computation may be applied to data values stored in the first time-series data file and in the second time-series data file that are associated with timestamp values that fall between the start time and the end time.

In block 558, the generated values may be transmitted to the user device for display in a user interface, such as an interactive user interface. In some embodiments, the generated values are also stored in the node data store 156.

Implementation Mechanisms

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

Computing device(s) are generally controlled and coordinated by operating system software, such as iOS, Android, Chrome OS, Windows XP, Windows Vista, Windows 7, Windows 8, Windows Server, Windows CE, Unix, Linux, SunOS, Solaris, iOS, Blackberry OS, VxWorks, or other compatible operating systems. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 6:
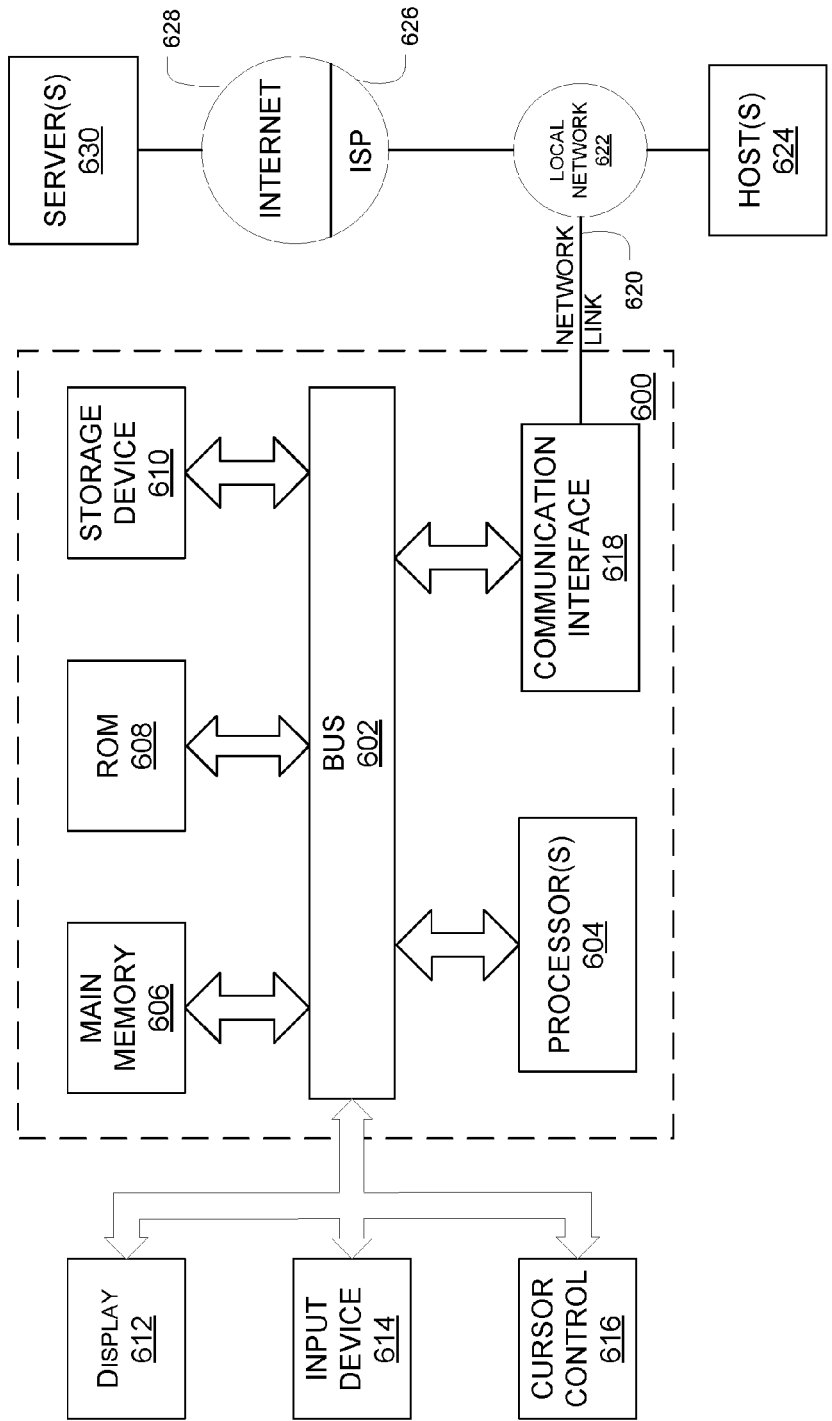
FIG. 6 illustrates a computer system with which certain methods discussed herein may be implemented, according to an embodiment.

For example, FIG. 6 is a block diagram that illustrates a computer system 600 upon which an embodiment may be implemented. For example, any of the computing devices discussed herein, such as the data source 110, the data server 140, the time-series data store 150, and/or the user device 160, may include some or all of the components and/or functionality of the computer system 600.

Computer system 600 includes a bus 602 or other communication mechanism for communicating information, and a hardware processor, or multiple processors, 604 coupled with bus 602 for processing information. Hardware processor(s) 604 may be, for example, one or more general purpose microprocessors.

Computer system 600 also includes a main memory 606, such as a random access memory (RAM), cache and/or other dynamic storage devices, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions. Main memory 606 may also store cached data, such as zoom levels and maximum and minimum sensor values at each zoom level.

Computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions. For example, the storage device 610 may store measurement data obtained from a plurality of sensors.

Computer system 600 may be coupled via bus 602 to a display 612, such as a cathode ray tube (CRT) or LCD display (or touch screen), for displaying information to a computer user. For example, the display 612 can be used to display any of the user interfaces described herein with respect to FIGS. 2A through 8. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x)

and a second axis (e.g., y), that allows the device to specify positions in a plane. In some embodiments, the same direction information and command selections as cursor control may be implemented via receiving touches on a touch screen without a cursor.

Computing system 600 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C, or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules or computing device functionality described herein are preferably implemented as software modules, but may be represented in hardware or firmware. Generally, the modules described herein refer to logical modules that may be combined with other modules or divided into sub-modules despite their physical organization or storage Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 610. Execution of the sequences of instructions contained in main memory 606 causes processor(s) 604 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 610. Volatile media includes dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 406, from which processor 604 retrieves and executes the instructions. The instructions received by main memory 606 may retrieve and execute the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN (or WAN component to communicated with a WAN). Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

TERMINOLOGY

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure. The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A database configured to receive and process requests associated with a plurality of stored time-series data and provide results to a user device for display in an interactive user interface, the database comprising:
    a discovery node comprising a first computer processor;
    a processing node comprising a second computer processor and memory; and
    a time-series database storing the plurality of time-series data, wherein the plurality of time-series data comprises first time-series data and second time-series data, and wherein the memory stores a copy of a portion of the plurality of time-series data; and
    a computer readable storage medium storing first program instructions and second program instructions,
        wherein the first program instructions are configured for execution by the first computer processor in order to cause the database to transmit a series expression, a start time, an end time, and a period received from the user device to the processing node, wherein the first time-series data and the second time-series data correspond to the series expression, and
    wherein the second program instructions are configured for execution by the second computer processor in order to cause the database to:
        retrieve, from the memory, a portion of the first time-series data and a portion of the second time-series data;
        for each period between the start time and the end time, identify a first data value from the portion of the first time-series data and a second data value from the portion of the second time-series data that are both associated with a same timestamp value, and
            generate a value based on a computation identified by the series expression that is applied to the first data value and the second data value.

2. The database of claim 1, wherein the second program instructions are further configured for execution by the second computer processor in order to cause the database to transmit the generated values to the user device for display in the interactive user interface.

3. The database of claim 1, wherein the first program instructions are further configured for execution by the first computer processor in order to cause the database to determine that the processing node is associated with the first time-series data and the second time-series data.

4. The database of claim 1, wherein the second program instructions are further configured for execution by the second computer processor in order to cause the database to retrieve, from the memory, data values from the first time-series data that are associated with timestamp values that fall within the start time and the end time and data values from the second time-series data that are associated with timestamp values that fall within the start time and the end time.

5. The database of claim 1, wherein the first data value comprises a plurality of data values that are each associated with a different timestamp value, and wherein the second data value comprises a plurality of data values that are each associated with a different timestamp value.

6. The database of claim 1, wherein the first program instructions are further configured for execution by the first computer processor in order to cause the database to:
receive, from a data source, third time-series data and fourth time-series data, wherein the third time-series data and the fourth time-series data correspond with a first sensor and comprise overlapping time values; and
compact the third time-series data and the fourth time-series data to generate the second time-series data.

7. The database of claim 6, wherein the first program instructions are further configured for execution by the first computer processor in order to cause the database to:
determine, for each overlapping time value, whether a third data value corresponding to the third time-series data or a fourth data value corresponding to the fourth time-series data is stored in a later-modified file; and
insert the data value stored in the later-modified file into the second time-series data in association with the respective overlapping time value.

8. The database of claim 1, wherein the start time and the end time correspond to a window of data viewed by a user via the interactive user interface.

9. The database of claim 1, wherein the period identifies a period of time that corresponds with a width of a pixel in the interactive user interface.

10. The database of claim 9, wherein the second program instructions are further configured for execution by the second computer processor in order to cause the database to:
determine whether the period is greater than a period of time between each timestamp value in the first time-series data;
aggregate data values such that a period of time between an earliest timestamp value corresponding to a data value in the aggregate and a latest timestamp value corresponding to a data value in the aggregate equals the period in response to a determination that the period is greater than the period of time between each timestamp value in the first time-series data; and
for each period between the start time and the end time,
identify a first aggregated data value from the portion of the first time-series data and the second data value from the portion of the second time-series data that are both associated with a same timestamp value, and
generate a value based on a computation identified by the series expression that is applied to the first aggregated data value and the second data value.

11. The database of claim 1, wherein the series expression identifies a first operation associated with the first time-series data and the second time-series data and a second operation associated with a result of the first operation and the first time-series data.

12. The database of claim 1, wherein the series expression comprises one of a sum, a difference, a product, a ratio, a moving average, a zScore, or a square root.

13. The database of claim 1, wherein the first time-series data stored in the time-series database is immutable.

* * * * *